United States Patent [19]

Cuevas

[11] Patent Number: 5,277,442
[45] Date of Patent: Jan. 11, 1994

[54] DRIVER SIDE INFLATABLE AIR BAG SYSTEM AND METHOD OF ASSEMBLY

[75] Inventor: Jess A. Cuevas, Scottsdale, Ariz.

[73] Assignee: TRW Inc., Lyndhurst, Ohio

[21] Appl. No.: 836,984

[22] Filed: Feb. 14, 1992

[51] Int. Cl.⁵ ............................................. B60R 21/16
[52] U.S. Cl. .................................. 280/731; 280/728 A
[58] Field of Search ............... 280/728, 731, 736, 740, 280/742, 728

[56] References Cited

U.S. PATENT DOCUMENTS

| | | | |
|---|---|---|---|
| 3,674,284 | 7/1972 | Lohr | 280/731 |
| 3,843,152 | 10/1974 | Nonaka | 280/731 |
| 3,915,474 | 10/1975 | Held et al. | 280/734 |
| 3,945,665 | 3/1976 | Tsutsumi et al. | 280/731 |
| 3,984,126 | 10/1976 | Goetz et al. | 280/740 |
| 4,101,146 | 7/1978 | Oehm | 280/731 |
| 4,167,276 | 9/1979 | Bell et al. | 280/731 |
| 4,810,005 | 3/1989 | Föhl | 280/732 |
| 4,828,286 | 5/1989 | Föhl | 280/731 |
| 4,877,264 | 10/1989 | Cuevas | 280/731 |
| 4,938,504 | 7/1990 | Fukuda et al. | 280/731 |
| 5,005,860 | 4/1991 | Mori et al. | 280/731 |

Primary Examiner—David M. Mitchell
Assistant Examiner—Andrew C. Pike
Attorney, Agent, or Firm—Calfee, Halter & Griswold

[57] ABSTRACT

An air bag system includes (i) a vehicle steering wheel having a structural frame which includes an integral retainer, (ii) a cover which together with the retainer forms a container, (iii) an inflator which is at least partially disposed within the container and which is coupled to the retainer, and (iv) an air bag which is disposed within the container and which includes a beaded perimeter that defines a gas inlet opening and that is captured between the inflator and the retainer thereby coupling the air bag to the retainer. To assemble the air bag system, the air bag is preassembled with the inflator by securing its beaded perimeter to the inflator. The inflator is then inserted into the retainer in such a manner that the beaded perimeter is captured intermediate the inflator and the retainer. Next, the inflator is coupled to the retainer and the cover is coupled to the steering wheel to form a container for the air bag.

15 Claims, 4 Drawing Sheets

DRIVER SIDE INFLATABLE AIR BAG SYSTEM AND METHOD OF ASSEMBLY

TECHNICAL FIELD

The present invention relates to an automobile air bag system, and more specifically to a driver side air bag system assembled sequentially within an automobile steering wheel in non-modular form, using the steering wheel as a structural element of the system.

BACKGROUND OF THE INVENTION

A vehicle air bag system is typically manufactured as a module and thereafter installed in a vehicle. A standard air bag module includes a folded air bag, an inflator or gas generator for inflating the air bag, and a container which encloses the air bag. Upon actuation of the inflator, gas at relatively high pressure is directed into the air bag, thereby deploying it through a portion of the container and inflating it to a predetermined configuration. The container is usually comprised of a reaction device and a cover. During deployment of the air bag, reaction forces are absorbed by the reaction device.

On the driver side of vehicle, the air bag module is commonly incorporated into the steering wheel. For example, in FIG. 1 of U.S. Pat. No. 4,828,286 to Fohl, an air bag module is disclosed which includes an air bag, an inflator, and a container comprising a reaction plate and a cover. The module is preassembled as a unit and is thereafter attached to the vehicle steering wheel by bolting the reaction plate to a structural member of the wheel.

Because space requirements are increasingly important in vehicle design, it is important that an air bag system be constructed from a minimum number of components and be as compact as possible. Also, as the number of air bags being installed in vehicles increases, it becomes increasingly important to provide efficient and effective ways of mass producing these air bag systems.

In the past, suggestions have been made for air bag systems which reduce both the number of parts and the total number of procedures required to construct the system. For example, U.S. Pat. No. 4,877,264 discloses an air bag module and method of assembly wherein a single retaining ring is used to secure an air bag and an inflator to a mounting plate. The inflator is first centered on the mounting plate. Thereafter, an assembly comprising an air bag and a retaining ring is lowered over the inflator. The assembly is attached to the mounting plate by lockingly engaging the retaining ring to the mounting plate. In attaching the retaining ring to the mounting plate, both the air bag and the inflator are secured to the mounting plate without requiring any additional fasteners.

While the air bag module of U.S. Pat. No. 4,877,264 eliminates some of the components of a conventional air bag module, it still includes a separate mounting plate to which the remaining components of the module are attached. It also includes a separate air bag retaining device intermediate the inflator and the mounting plate. Each of these items adds size and weight to the air bag module. Moreover, the presence of these items increases the complexity of the module and, accordingly, the number of procedures required to assemble the module.

SUMMARY OF THE INVENTION

The present invention provides a new and useful air bag system and method of assembling the same. The system is manufactured in non-modular form as part of a vehicle steering wheel by assembling the system components directly into a hollow cavity in the steering wheel. The air bag system so formed eliminates the need for a separate reaction device for the inflator. Additionally, the air bag system is designed to eliminate the need for separate fasteners and retainers for the air bag. By eliminating these components from the air bag system, the overall weight of the system is reduced, and the system may be quickly and efficiently assembled directly into the steering wheel by performing only a few assembly steps.

More particularly, the present invention provides an air bag system comprising (i) a vehicle steering wheel having a structural frame which includes an integral retainer, (ii) a cover which together with the retainer forms a container, (iii) an inflator which is at least partially disposed within the container and which is coupled to the retainer, and (iv) an air bag disposed within the container. The retainer holds the inflator within the steering wheel and absorbs reaction forces generated by the inflator during inflation of the air bag, thereby serving as a reaction device. The air bag includes a gas inlet opening defined by a beaded perimeter which is captured between the inflator and the retainer, thereby coupling the air bag to the retainer. In this manner, the system requires no separate air bag retainers or fasteners.

The present invention also provides a method of forming a driver side air bag system. In this method, the air bag is preassembled with the inflator by securing its beaded perimeter to the inflator. The inflator is then inserted into the portion of the container formed by the retainer in such a manner that the beaded perimeter is captured intermediate the inflator and the retainer. Next, the inflator is coupled to the retainer and the cover is coupled to the steering wheel to form a container for the air bag.

The inflator is preferably coupled to the retainer using either of two techniques. According to one coupling technique, referred to as the breech locking technique, the inflator includes a housing having a plurality of outwardly extending tabs. The retainer includes a corresponding number of slots sized to receive the tabs. After the inflator is inserted into the container, the inflator is rotated with respect to the retainer in such a manner that the outwardly extending tabs lockingly engage the slots.

In the second coupling technique, referred to as the pin locking technique, the outer surface of a base portion of the inflator is provided with a tangential groove. The retainer is provided with a bore that is sized and shaped to be aligned with the groove when the inflator is properly oriented and seated within the retainer. The bore in the retainer faces the tangential groove in the inflator housing. A pin is then inserted into the space defined by the facing bore and groove to couple the inflator to the retainer.

Other features of the present invention will become apparent from the following description and accompanying drawings.

DETAILED DESCRIPTION OF THE PREFERRED EMBODIMENTS

Figure 1A:
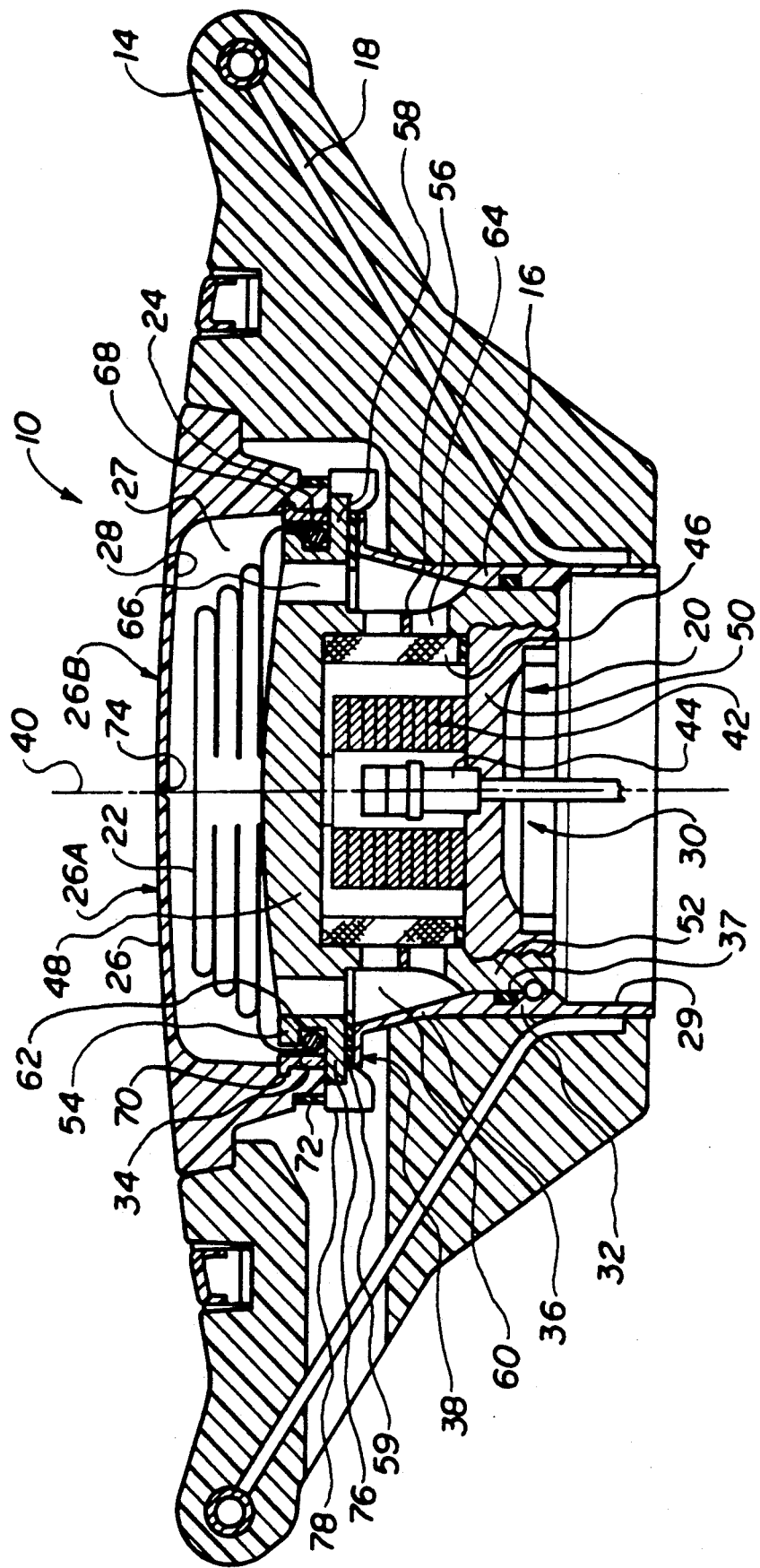
FIG. 1A is a sectional view of a first embodiment of an air bag system constructed according to the principles of the present invention.
Figure 1B:
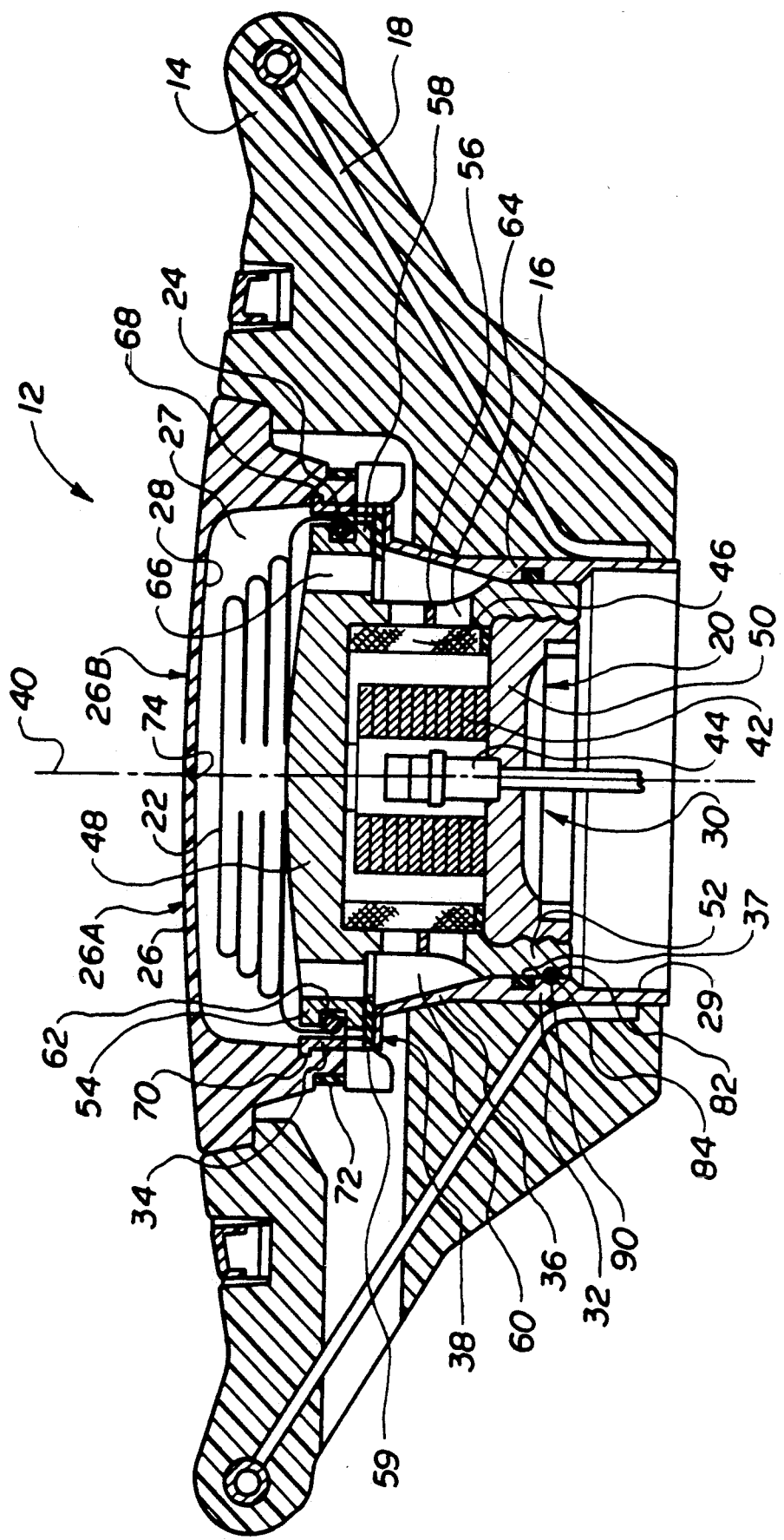
FIG. 1B is a sectional view of a second embodiment of an air bag system constructed according to the principles of the present invention.

Referring now to the drawings, two preferred embodiments of a driver side air bag system constructed according to the present invention are shown generally at 10 and 12, in FIGS. 1A and 1B, respectively. The systems 10 and 12 are identical except for the manner in which an inflator is coupled to the system in a force transmitting relationship.

Referring to either of FIGS. 1A or 1B, the air bag system is schematically illustrated as installed in the steering wheel 14 of a vehicle. Each of the systems shown in FIGS. 1A and 1B comprises a retainer 16 which is die cast as part of the skeletal structure or frame 18 of the steering wheel 14, an inflator 20 which is coupled to the retainer 16, an air bag 22 having a beaded periphery 24 which defines a gas inlet opening and which is captured between the retainer and the inflator, and a cover 26 which is attached to the retainer to complete the system. The air bag 22 is folded in a predetermined configuration above the inflator 20 in a cavity 27 defined by an inner surface 28 of the cover 26. The retainer 16 holds the inflator 20 within the steering wheel 14 and absorbs reaction forces generated by the inflator during deployment of the air bag, thereby serving as a reaction device for the system.

The retainer 16 and the steering wheel frame 18 are both preferably constructed from hardened steel which has been die cast, a known metal casting process wherein molten metal is forced under pressure into a permanent mold. The retainer includes a generally cylindrical wall 29 which is open at both ends and which defines a generally cylindrical cavity 30 near the center of the steering wheel (see also FIGS. 2-4). The retainer wall 29 comprises a cylindrical base portion 32, a cylindrical upper portion 34 having a diameter slightly larger than that of the base portion 32, and a frusto-conical central portion 36 intermediate the base and upper portions.

The cylindrical base portion 32 of the retainer wall 29 receives the inflator 20 which fits snugly against the inner surface of the base portion. In the preferred embodiment, an O-ring 37 is disposed in a groove formed in the inner surface of the base portion 32 to help seal the retainer/inflator interface against fluid leaks. The upper portion 34 of the retainer wall has an annular shelf 38 which extends away from a longitudinal central axis 40 of the cylindrical cavity. The shelf 38 of the retainer provides a structural support upon which a portion of the inflator is seated in the completed air bag system.

The inflator 20 shown in FIGS. 1A and 1B includes a solid gas generant 42, a squib 44 for igniting the gas generant to generate gas rapidly, and a filter 46 for filtering the gas before it enters the air bag. The gas generant 42, the squib 44 and the filter 46 are contained within an inflator housing 48 which is closed by an end cap 50. The end cap 50 screws into a base portion 52 of the inflator housing 48 to complete the inflator. The internal construction of the inflator 20 used in the system does not form part of the present invention, however, and thus will not be described in further detail. Other inflator constructions are contemplated by the present invention, including, for example, inflators that include a quantity of gas stored under pressure with or without a combustible gas and/or heat generating material.

Figure 5:
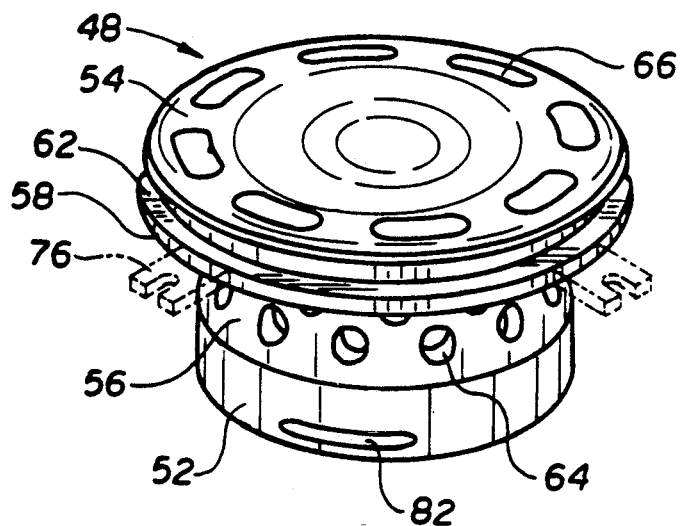
FIG. 5 is a perspective view of the inflator used in the systems of FIGS. 1A and 1B.
Figure 6:
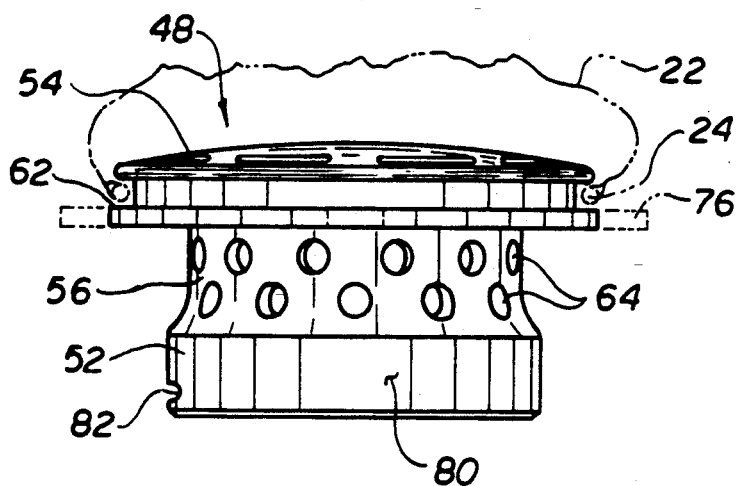
FIG. 6 is a side view of the inflator used in the systems of FIGS. 1A and 1B.
Figure 7:
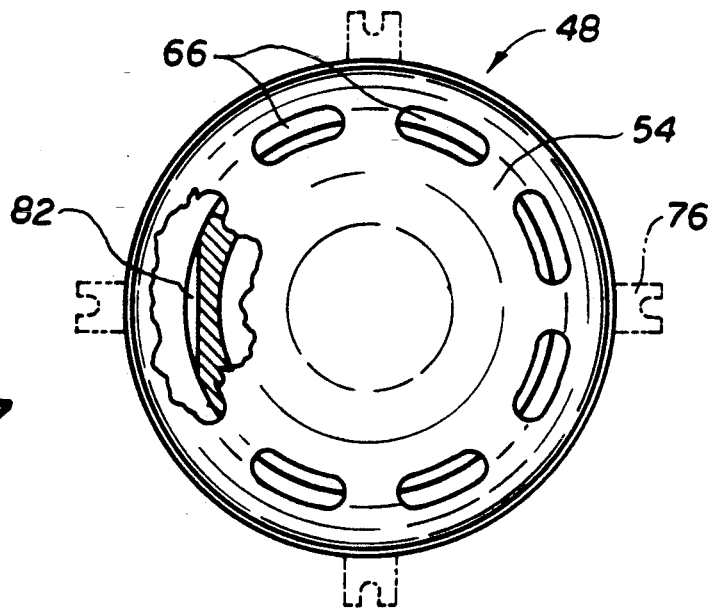
FIG. 7 is a top view of the inflator used in the systems of FIGS. 1A and 1B.

The inflator housing 48, shown in greater detail in FIGS. 5-7, includes a cylindrical upper portion 54 having a diameter slightly larger than that of the base portion 52, and a generally cylindrical central portion 56 intermediate the base and upper portions and having a diameter smaller than that of the base portion 52. The base portion 52 of the inflator housing 48 fits snugly within the base portion 32 of the retainer wall 29. The upper portion 54 of the inflator housing 48 includes a flange 58 which seats against the shelf 38 on the upper portion 34 of the retainer wall 29, when the inflator is inserted into the retainer. Preferably, an annular sealing gasket 59 is inserted between the shelf 38 and the flange 58. In the preferred embodiments of the present invention the gasket 59 is comprised of a flexible graphite material, and the distance between the inner and outer diameters of the gasket 59 is only slightly greater than the distance by which the annular shelf 38 extends away from the longitudinal central axis 40 of the cylindrical cavity. When the base portion 52 of the inflator housing 48 is positioned within the base portion 32 of the retainer wall 29, the central portion 56 of the inflator housing and the frusto-conical portion 36 of the retainer wall define a channel 60 which surrounds the entire central portion of the inflator housing.

The upper portion 54 of the inflator housing 48 is also provided with a groove 62 above the flange 58. The beaded periphery 24 of the air bag 22 which defines the gas inlet opening is inserted into the groove 62 prior to inserting the inflator into the retainer. When the inflator 20 is then inserted into the retainer 16 to complete the air bag system, the beaded perimeter 24 of the air bag 22 is captured between the upper portion 34 of the retainer wall 29 and the upper portion 54 of the inflator housing.

A plurality of gas discharge nozzles 64 are formed in the central portion 56 of the inflator housing 48 (see also FIGS. 5 and 6). The nozzles 64 are oriented radially and perpendicular to the longitudinal axis 40 of the retainer cavity 30. A plurality of gas passageways 66 are formed in the upper portion 54 of the inflator housing 48 (see also FIGS. 5 and 7). These passageways 66 are oriented parallel to the longitudinal axis 40 and are disposed radially outward from this axis beyond the inflator housing central portion 56. The combination of the nozzles 64 and the passageways 66 permits gas generated within the inflator 20 to be discharged by the inflator and into the air bag 22.

As can be seen in FIGS. 1A and 1B, gas produced by the inflator is directed through the gas discharge nozzles 64 and into the channel 60 formed between the central portions of the inflator housing and the retainer wall. The gas strikes and is deflected away from the central portion 36 of the retainer wall 29, which slants away from the longitudinal axis 40 of the retainer cavity 30. Because the annular sealing gasket 59 does not extend into either the channel 60 or the gas passageways 66, the deflected gas is redirected through the gas passageways 66 and into the air bag 22 through the gas inlet opening. The air bag thus begins to inflate and expand within the cavity 27 defined by the inner surface 28 of the cover 26.

The cover 26 is formed of a soft, flexible material such as a urethane (e.g. polyurethane) or an engineered plastic, which is preferably colored and decorated, at least on its front face, to enhance the aesthetic appearance of the steering wheel. The cover 26 is preferably maintained in position upon retainer 16 by engaging a groove 68 in the inner surface 28 of the cover with a lip 70 extending from the upper portion of the retainer. The flexible cover material permits the cover to be flexed so as to pass over and engage the lip 70. A metal band 72 surrounds the outer perimeter of the portion of the cover which engages the lip 70 and is tightened to bias the cover into tight engagement with the lip.

In the preferred embodiment, the inner surface 28 of cover 26 is scored along a tear seam 74, preferably in an H-shape along its front face, to facilitate deployment of the air bag into the vehicle passenger compartment once the inflator 20 is actuated. Thus, in the subject embodiment, the cover 26 bursts along the tear seam 74 as the bag is inflated, forming upper and lower flap portions 26A and 26B which are pushed out of the way to permit expansion of the air bag. The beaded periphery 24 of the air bag 22, which is captured between the inflator housing 48 and the retainer wall 29, resists the inflation forces which tend to separate the air bag from the system. The structural portion of the vehicle steering wheel, which is in part formed by the retainer 16, absorbs the reaction forces transmitted by the inflator 20 as the bag is being inflated.

The foregoing description is applicable to the construction of either the air bag system 10 of FIG. 1A or the air bag system 12 of FIG. 1B. As explained above, the systems 10 and 12 are identical except for the manner in which the inflator is coupled in force transmitting relationship to the retainer 16.

Figure 2:
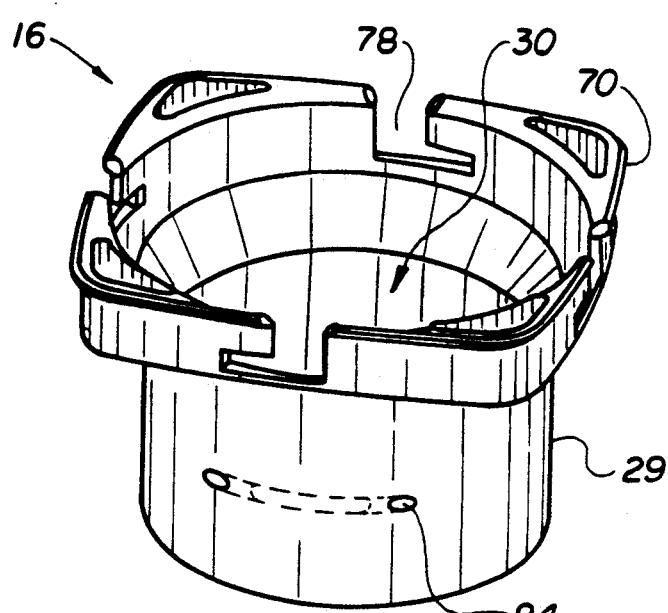
FIG. 2 is a perspective view of the retainer used in the systems of FIGS. 1A and 1B.
Figure 3:
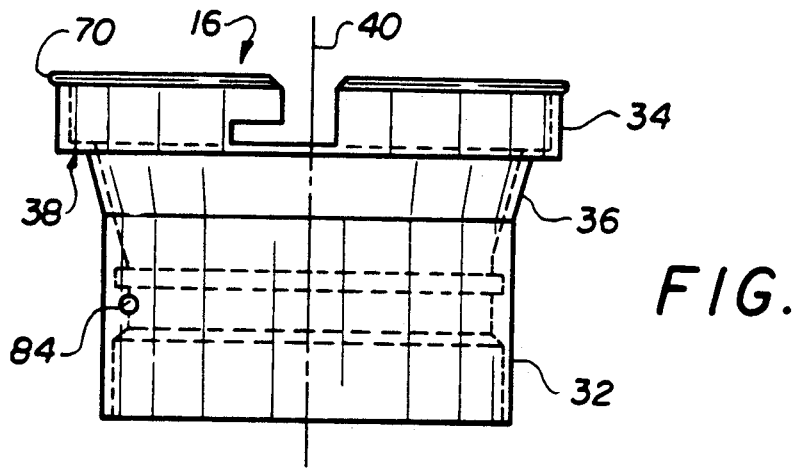
FIG. 3 is a side view of the retainer used in the systems of FIGS. 1A and 1B.
Figure 4:
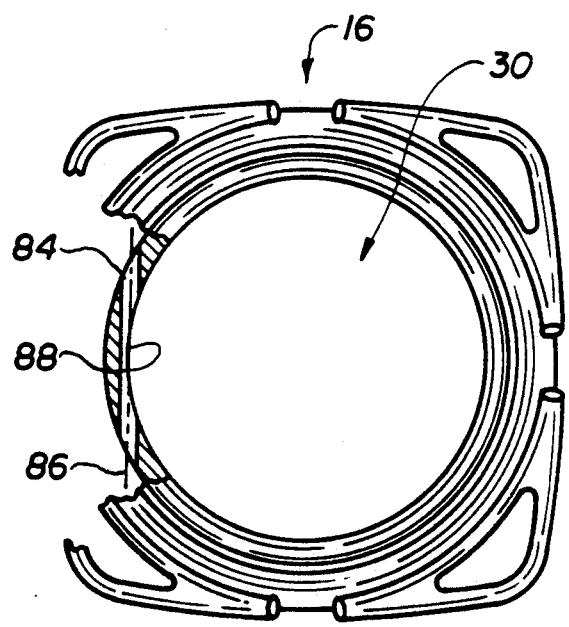
FIG. 4 is a top view of the retainer used in the systems of FIGS. 1A and 1B.

Referring now specifically to FIG. 1A, the breech locking technique of coupling the inflator 20 with the retainer 16 is shown. In this embodiment of the invention, the flange 58 on the upper portion 54 of the inflator housing 48 is provided with a plurality of tabs 76 which extend radially from and perpendicular to the longitudinal axis 40 (FIGS. 5-7). The upper portion 34 of the retainer wall 29 is provided with a corresponding number of L-shaped slots 78 (FIGS. 2-4). The slots 78 receive the tabs 76 as the inflator 20 is inserted into the retainer cavity 30. When the inflator flange 58 abuts the retainer shelf 38, the inflator is rotated clockwise relative to the retainer to lock the inflator tabs 76 into the undercut portions of the retainer slots 78. In the preferred embodiment, the inflator is rotated about twelve degrees clockwise. The cover 26 may then be attached to the upper portion 34 of the retainer wall 29 to complete the air bag system 10.

FIG. 1B illustrates the pin locking technique of coupling the inflator 20 with the retainer 16 in the air bag system 12. In this embodiment of the invention, the tabs 76 are not included in the upper portion of the inflator housing. An outer surface 80 of the inflator housing base portion 52 is provided with a tangential semicircular groove 82 (FIG. 6). As shown in FIG. 4, an inner surface 88 of the retainer wall base portion 32 is provided with a bore 84, the central axis 86 of which is tangential to the surface 88. The inflator 20 is inserted into the retainer cavity 30 and rotated until the bore 84 in the retainer wall faces the tangential groove 82 in the inflator housing, as shown in FIG. 1B. A pin 90 is thereafter inserted into the hole which is defined by the facing bore and groove to couple the inflator 20 to the retainer 16. The pin is designed to be self-locking once inserted into the hole. Although not specifically shown in the drawings, access to the hole is provided through the plastic shroud of the steering wheel. The cover 26 may then be attached to the upper portion 34 of the retainer wall 29 to complete the air bag system 12.

In each of the foregoing techniques, the air bag 22 is preassembled with the inflator 20 which is then positioned within the retainer cavity 30. The inflator is thereafter coupled to the retainer in a force transmitting relationship, using either the breech locking or pin locking technique, thereby simultaneously trapping the beaded periphery 24 of the air bag 22 between the inflator and the retainer and securing the inflator to the retainer.

While the preferred embodiment of the invention has been described in detail, it should be apparent that the invention may be incorporated into air bag systems comprising other materials, constructions, or designs, and that such additional modifications will be apparent to those of ordinary skill in the art. The invention is thereby intended to cover all devices and methods of construction as defined by the appended claims.

I claim:

1. An air bag system comprising:
   a vehicle steering wheel having a structural frame which includes an integral retainer,
   a cover which together with said retainer forms a container,
   an inflator which is at least partially disposed within said container and which is coupled to said retainer, and
   an air bag disposed within said container, said air bag including a beaded periphery which defines a gas inlet opening and which is captured between said inflator and said retainer thereby coupling said air bag to said retainer,
   said inflator including a housing having an exterior surface which is positioned adjacent to said retainer and which includes a tangential groove;
   said retainer including a bore aligned with said tangential groove; and
   said system further including a pin disposed within said tangential groove and said bore to couple said inflator housing to said retainer.

2. The air bag system of claim 1, wherein:
   said inflator includes a housing having a plurality of outwardly extending tabs;
   said retainer includes a corresponding number of slots sized to receive said tabs; and
   said tabs are received in said slots to couple said inflator housing to said retainer.

3. The air bag system of claim 2 wherein:

said inflator housing includes a central portion and an upper portion;

said central portion is spaced apart from said retainer and includes a plurality of gas discharging nozzles;

said upper portion faces said gas inlet opening and includes a plurality of gas passages; and said gas passages are disposed generally perpendicular to said gas discharging nozzles whereby gas discharged by the inflator through said gas discharging nozzles is redirected by said retainer toward said gas passages and into said air bag.

4. The air bag system of claim 2, wherein said inflator housing includes an upper portion that is provided with a grooved perimeter which mates with said beaded periphery of said air bag.

5. The air bag system of claim 2, wherein said container and said inflator housing are generally cylindrical in shape.

6. The air bag system of claim 2, wherein said cover is attached to said retainer.

7. The air bag system of claim 1, wherein:

said inflator housing includes a central portion which is spaced apart from said retainer and which is provided with a plurality of gas discharging nozzles;

said inflator housing further includes an upper portion which faces said gas inlet opening and which is provided with a plurality of gas passages; and said gas passages are disposed generally perpendicular to said gas discharging nozzles whereby gas discharged by the inflator through said gas discharging nozzles is redirected by said retainer toward said gas passages and into said air bag.

8. The air bag system of claim 1, wherein said inflator housing includes an upper portion that is provided with a grooved perimeter which mates with said beaded periphery of said air bag.

9. The air bag system of claim 1, wherein said container and said inflator housing are generally cylindrical in shape.

10. The air bag system of claim 1, wherein said cover is attached to said retainer.

11. A method of forming a driver side air bag system comprising a vehicle steering wheel having a structural frame which includes an integral retainer forming an open-ended container, and an air bag having a beaded periphery which defines a gas inlet opening, said method comprising the steps of:

securing the beaded periphery of the air bag to an inflator for inflating the air bag;

after the beaded periphery of the air bag is secured to the inflator, inserting the inflator into the retainer so that the beaded periphery is captured intermediate the inflator and the retainer;

coupling the inflator to the retainer; and attaching a cover to the retainer to close the container.

12. The method of claim 11 wherein:

said step of coupling the inflator to the retainer includes the steps of aligning a tangential groove in the exterior surface of the inflator and a bore in the retainer and inserting a pin through the bore and the tangential groove.

13. The method of claim 12, wherein:

said step of securing the beaded periphery of the air bag includes the step of mating the beaded periphery with a peripheral groove in the inflator.

14. A method of forming a driver side air bag system comprising an inflator with a housing having a plurality of outwardly extending tabs, a vehicle steering wheel having a structural frame including an integral retainer which forms an open-ended container and which has a corresponding number of slots sized to receive the tabs, and an air bag having a beaded periphery which defines a gas inlet opening, said method comprising the steps of:

securing the beaded periphery of the air bag to the inflator;

inserting the inflator into the retainer so that the beaded periphery is captured intermediate the inflator and the retainer;

coupling the inflator to the retainer; and coupling a cover to the steering wheel to close the container;

said step of coupling the inflator to the retainer including the step of rotating the inflator with respect to the retainer in such a manner that the outwardly extending tabs lockingly engage the slots.

15. The method of claim 14, wherein:

said step of securing the beaded periphery of the air bag includes the step of mating the beading periphery with a peripheral groove in the inflator.

* * * * *